Feb. 7, 1967  A. J. WHITE  3,302,295
ADJUSTABLE BORE GAUGE
Filed Feb. 11, 1964
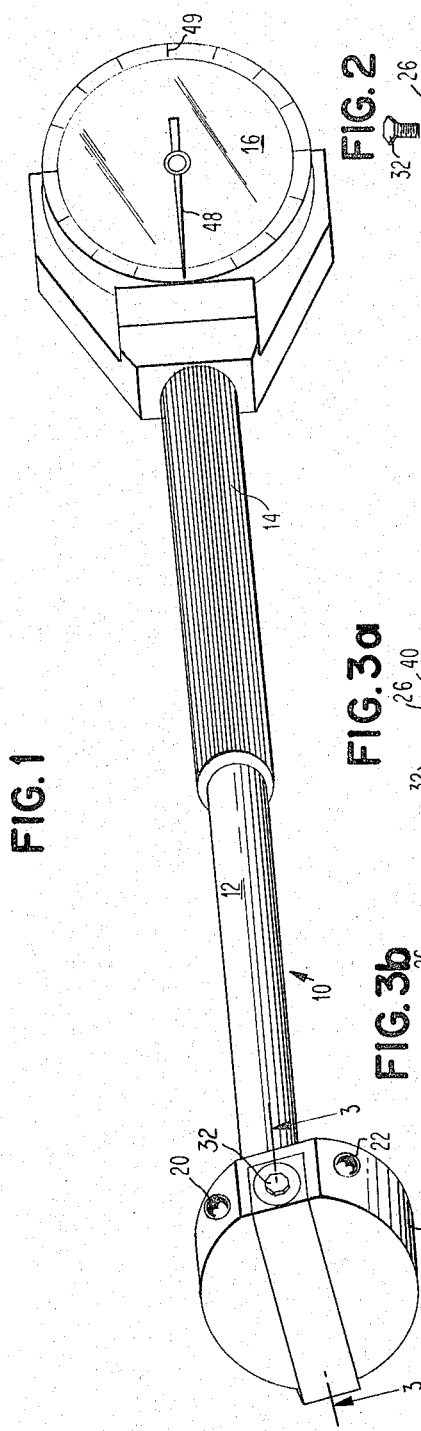
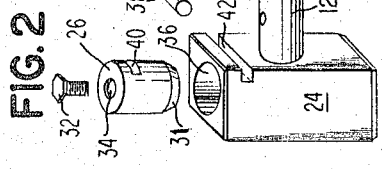
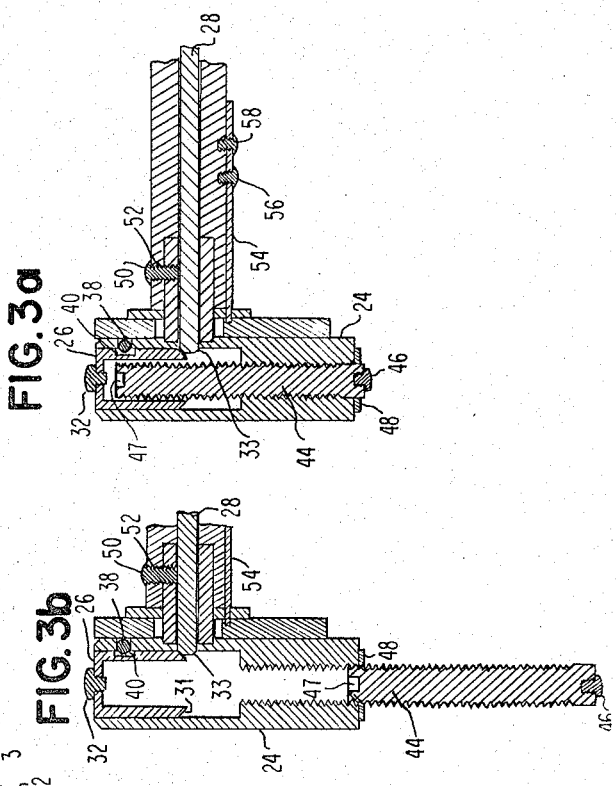
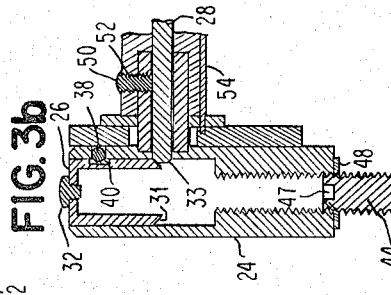
INVENTOR,
ALBERT J. WHITE

United States Patent Office 3,302,295
Patented Feb. 7, 1967

3,302,295
ADJUSTABLE BORE GAUGE
Albert J. White, Kingston, N.Y., assignor, by mesne assignments, to B. C. Ames Co., Waltham, Mass., a corporation of Massachusetts
Filed Feb. 11, 1964, Ser. No. 344,057
2 Claims. (Cl. 33—147)

The present invention relates to bore gauges and more particularly is directed to an adjustable dial indicator bore gauge.

In conventional bore gauges, measurement of various bore ranges is generally accomplished by a single gauge and a plurality of range extensions. Since the increments of bore openings which can be accommodated by conventional range extensions are very nominal, a substantial number of extensions and frequent changing thereof is required to measure varying bore diameters. Continual changing of range extensions, however, requires an inordinate amount of time in addition to the high initial cost of a complete set of extensions. It is thus desirable to increase the over-all range increments which can be measured by a single extension, thereby affording lower cost and increased efficiency in bore measurements.

In conventional bore gauges, range increments accommodated by a single range extension have been heretofore largely limited by the transfer mechanism utilized to provide the 90° motion transfer from the gauge head to the indicator mechanism. In known devices of the prior art, such transfer mechanisms, which might comprise, for example, levers, bell cranks, etc., have been positioned at the intersection of the motion transmitting members, such that the space available for range extensions is severely restricted.

In accordance with the present invention, there is provided a bore gauge in which the transfer assembly includes a hollow gauging cam or pin mounted within the gauging head, the cross-sectional area of the gauging pin opening being designed to accommodate a range extension, the gauging pin itself comprising one of the elements of the transfer assembly. Since the range extensions are enabled to fit within the hollow gauging pin, the space formerly required for the transfer mechanism is available for the range extension, whereby the measuring efficiency of the bore gauge is substantially increased. The inner portion of the gauging head is partially threaded to engage the corresponding threaded periphery of the range extension. By utilizing this arrangement, the range extension is encompassed by the hollow gauging pin, such that in one extremity the outer periphery of the range extension nearly abuts the moveable contact of the gauge, while in the opposite extremity it extends into the gauging head the minimum distance required for engagement of the threaded members. By utilizing the space formerly required for the transfer mechanism, the measurement range of each extension is substantially expanded and the number of range extensions correspondingly reduced. The transfer assembly itself, by employing the gauging pin as one of the transfer elements, is vastly simplified compared to intricate and complex transfer mechanisms employed in conventional bore gauges. Finally, the wear factor favors a hollow large diameter gauging pin compared to the conventional gauging pin due to the larger displacement area over which the wear is distributed, thereby permitting greater tolerances over a larger critical area.

Accordingly, a primary object of the present invention is to provide an improved bore gauge.

Another object of the present invention is to provide an improved dial indicator bore gauge adapted to substantially increase the measuring potential of each range extension.

A further object of the present invention is to provide an improved bore gauge transfer mechanism.

Another object of the present invention is to provide an improved dial indicator bore gauge wherein the gauging pin constitutes one of the elements of the transfer mechanism.

Still another object of the present invention is to provide an improved bore gauge having a hollow gauging pin adapted to accommodate a range extension whereby the measurement afforded by the range extension is substantially extended.

The foregoing and other objects, features and advantages of the invention will be more apparent from the following more particular description of a preferred embodiment of the invention, as illustrated in the accompanying drawings.

In the drawings:

FIG. 1 is a front elevation view of an improved bore dial indicator gauge according to a preferred embodiment of the present invention.

FIG. 2 is an exploded view of the gauging head assembly illustrating details of the components thereof.

FIG. 3a is a section of the gauging head assembly taken along the line 3—3 of FIG. 1, showing the range extension at its minimum extremity.

FIG. 3b is a section of the gauging head assembly taken along the line 3—3 of FIG. 1, showing the range extension at its maximum extremity.

Referring now to the drawings and more particularly to FIG. 1 thereof, the preferred embodiment of the instant invention is shown as a dial indicator bore gauge generally designated 10 comprising an equalizing head assembly 11, a tubular stem or sleeve 12, an insulated handle member 14 for gripping the gauge, and a dial indicator 16 mounted on the opposite end of stem 12, the length of the stem 12 being generally determined by the depth of the hole to be measured. The tubular stem, handle, and indicator are assumed to be of conventional design and included only generally within the scope of the present invention. Associated with the equalizing head assembly is the movable measuring contact 32 mounted on a chordal plane with equalizing contacts 20, 22 perpendicular to the general axis of the recess or bore.

To ensure a true and accurate measurement of the bore opening, it is necessary that the measurement be taken on a diametrical plane perpendicular to the general axis of the recess or bore rather than on some lesser chord of the bore circumference. This function is performed by centralizing or equalizing contacts 20, 22, which comprise spheres mounted within machined openings in aluminum equalizing head 11. The spheres could be metallic or composed of a plastic material such as nylon which would not scratch a finished hole. These equalizing contacts are readily "fixed" and friction mounted within the recessed openings as contrasted with the more conventional spring biased centralizing contacts. The stationary contact member, mounted opposite in a diametrical line with moveable contact 32 at the range extension extremity, does not appear in the illustration of FIG. 1, but is fully shown and described in detail hereinafter.

Referring now to FIG. 2, the measuring or gauging head assembly is shown in exploded form with the parts broken away to illustrate the details of construction and clarify the relationship and cooperation between the component parts thereof. Mounted within the gauging head 24 is the hollow gauging cam or pin 26 having a 45° chamfered or beveled surface 31. The gauging pin 26 and the similarly beveled terminal of plunger 28 (FIG. 3) within stem 12 comprise the 90° transfer mechanism of the instant invention. The transfer or engageable surface 31 of the gauging pin is an accurately machined chamfer surface inclined at 45° to the angle of displacement of the plunger 28. The terminating or transfer portion of plunger 28 has a spherical or, as illustrated in the preferred embodiment, a complementary 45° chamfered surface 33 (FIG. 3a), either of which cooperate with the chamfered surface of the hollow gauging pin 26 to provide a direct one to one transfer. The bottom portion of contact 32 is threaded to engage the corresponding threaded opening 34 of gauging pin 26, after which the contact assembly is mounted within the bore 36 of gauging head 24.

In order to retain the gauging pin assembly 26 within gauging head 24 while limiting the movement thereof, the gauging pin assembly is provided with a recessed opening 40, while a dowel pin or key 38, inserted into the notched opening 42 of gauging head 24, also maintains the gauging pin 26 in a biased position relative to the gauging head 24 through recessed opening 40. By this arrangement it is possible to readily insert the gauging pin 26 into the gauging head assembly and retain the gauging pin therein while limiting the movement thereof. Though not apparent in the perspective view of FIG. 2, the notch or slot 40 of pin 26 is actually larger than the size of dowel pin 38 by the amount of indicator travel. This feature is more accurately illustrated in FIGS. 3a and 3b. The slot 40 in cooperation with dowel pin 38 also prevents rotation of the contact assembly 26, while the notch 42 of gauging head 24 provides a tight frictional fit for dowel pin 38. Typical movements for gauges of this type are .030", .040", .060", 1.00", etc.

Range extension 44 and its associated threaded contact 46 comprise the stationary or fixed contact of the bore gauge which extends through the hollow opening of gauging cam 26 to the position indicated in FIG. 3a. The upper portion of the range extension has an opening 47 sufficient to clear the bottom portion of contact 32. When adjusted to its desired position, range extension 44 is maintained in position by lock nut 48, and contact 46, which locks into position within extension 44 when initially inserted, provides the necessary adjustment.

Referring now to FIG. 3a, the gauging head assembly including the transfer mecranism is illustrated in section to clarify details thereof. As shown, the bore gauge is adjusted to approximately its minimum setting with range extension 44 extending through the hollow opening of gauging pin 26. At its minimum setting, the top 47 of range extension 44 would be positioned within indicator travel distance of the top inner surface of gauging pin 26. To initially adjust the gauge, the range extension 44 is inserted until its upper surface abuts the inside surface of the gauging pin 26, after which the range extension would be retracted the required distance determined by the indicator scale setting. The lower interior portion of gauging head 24 is threaded to accommodate the threaded range extension 44. Range extension 44 is adjusted within the gauging head by contact 46, the bottom surface of which has flats machined on each side to facilitate a desired setting by means of a wrench or similar device. The interior portion of gauging pin 26 is not threaded, but affords sufficient circumferential clearance for range extension 44.

The plunger 28 passes through a bore in tubular stem 12 and transmits motion to the dial indicator mechanism (not shown) with dial casing 16 upon which is mounted a pointer 48 (FIG. 1). The dial 16 carrying an arcuate measuring scale 49 is initially adjusted to its zero point through conventional means previously described; thereafter any motion of gauging pin 26 is transmitted to plunger 28 to be recorded by pointer 48. Since plunger 28 must be free to move within bore 30, the stem 12 has a bushing (not shown) on the indicator end. Since the gauging head assembly is machined to accept plunger 28, the plunger moves in the gauging head assembly while the bushing moves in the stem 12. The stem 12 is assembled on bore 30 and secured with screw 50, although it will be appreciated that screw 50 must not contact plunger 28 and thereby restrict its movement. A leaf spring 54, held in position by screws 56, 58 biases the centralizing head 11 in its normal position with respect to stem 12 and returns it to its normal position after each measurement of removal of the gauge from the hole.

Referring to FIG. 3b, the gauging head assembly is identical to that shown in FIG. 3a, except that the range extension 44 is in the opposite extremity than that shown in FIG. 3a. The threaded range extension extends into the gauging cam 26 the minimum distance required to engage the threads. A comparison of FIGS. 3a and 3b illustrates graphically the wide range variation of a single range extension made possible by utilizing the space formerly required for the transfer mechanism. As one specific example, the present invention permits a single range extension to cover bore measurements between 1¾" and 3", a range formerly requiring three separate range extensions.

The indicator 16 shown in the preferred embodiment is rotatable 360° to accommodate the convenience of the operator. While a direct reading indicator is shown, the invention is equally applicable to a perpendicular indicator and mounting, such indicator providing general or commercial methods of amplification. The instant invention is likewise applicable to air or electronic gauging by substituting appropriate indicators and conventional air or electronic attachments.

While the invention has been shown and described with particular reference to a preferred embodiment, it will be understood by those skilled in the art that various changes in form and details may be made without departing from the spirit and scope of the invention.

What is claimed is:

1. A bore gauge comprising in combination a tubular stem and an associated plunger mounted therein, and adapted to move along a longitudinal axis thereof, an equalizing head assembly operatively connected to one end of said tubular stem and adapted for insertion into a bore opeing to be measured, a dial indicator operatively connected to the opposite end of said tubular stem for actuation by said plunger, a gauging head mounted within said equalizing head assembly, said gauging head including a hollow gauging pin comprising a first measuring contact and being movable therein, a range extension having a length substantially equal to the dimension of said equalizing head transverse to said longitudinal axis, said gauging head having an opening transverse to said longitudinal axis and adapted to accommodate said hollow gauging pin and said range extension when adjustably positioned therein, said gauging pin and said range extension being adapted to telescope during certain bore measurements, and means for translating the motion of said hollow gauging pin to said plunger.

2. A device of the character claimed in claim 1 wherein said motion transmitting means comprises the complementary surfaces of said hollow gauging pin and said plunger.

References Cited by the Examiner

UNITED STATES PATENTS

| | | | |
|---|---|---|---|
| 2,601,496 | 6/1952 | Boat | 33—178 |
| 2,810,202 | 10/1957 | Eisele | 33—178 X |

FOREIGN PATENTS

| | | |
|---|---|---|
| 855,458 | 12/1940 | France. |
| 889,696 | 9/1953 | Germany. |
| 646,248 | 11/1950 | Great Britain. |

LEONARD FORMAN, *Primary Examiner.*

SAMUEL S. MATTHEWS, *Assistant Examiner.*